Sept. 9, 1958        R. D. RUMSEY        2,851,058

TUNED PULSE DAMPER

Filed Dec. 26, 1956

Inventor
ROLLIN DOUGLAS RUMSEY

By Hill, Sherman, Meroni, Gross & Simpson    Attys.

# United States Patent Office

2,851,058
Patented Sept. 9, 1958

2,851,058

TUNED PULSE DAMPER

Rollin Douglas Rumsey, Buffalo, N. Y., assignor to Houdaille Industries, Inc., Buffalo, N. Y., a corporation of Michigan Application December 26, 1956, Serial No. 630,702

7 Claims. (Cl. 138—26)

This invention relates to a pulsation damper structure that is adapted to dampen a pulsating fluid flow, and more particularly relates to a tuned pulse damper structure which utilizes substantially a two element construction, that when assembled, defines the long and short branch of a divided flow path through the damper in order to obtain the dampening effects of the invention.

One of the problems being encountered in the conventional 1500 p. s. i. variable delivery pumps that are currently being used in aircraft has been that of preventing structural failure of the hydraulic lines and damage to adjacent components in the aircraft, by damping out the relatively large surge pulsations of the pump that may reach magnitudes of the order of plus or minus 1000 p. s. i., when the pump is operating at full rated capacity. The variable delivery axial piston type pump has found particular application as a drive for the various accessories in aircraft, because of its efficiency throughout a wide range of controlled delivery rates, but has the disadvantage of imposing the large surge pulsations on the flow above mentioned.

In the past, the typical pulsation damper was a relatively large, complex device, having many moving parts that necessitated periodic inspection, adjustment and replacement. In addition, due to their size and complexity, these dampers were expensive to manufacture and maintain, which factors prevented their use in more extensive applications.

The tuned pulsation damper construction of the present invention offers a solution to many of these problems in the form of an improved damper construction that is efficient in operation, that consists essentially of only two parts, which are non-moving, that is compact and light-weight, and that is economical and easy to manufacture.

Briefly described, the tuned pulsation damper construction of the present invention contemplates a generally hollow cylindrical damper body having a cavity formed therein, which defines a head portion and a tubular skirt portion on the body. The head portion is suitably bored to define an inlet and an outlet for the pulsation damper, and the tubular skirt portion is internally threaded to receive a generally cylindrical externally threaded plug member having an annular radially flanged portion at one end, which serves to close the open end of the damper body when the parts are assembled, and an axially depending tubular portion that extends into the inlet of the head portion of the damper body, and defines an annular flow passage or orifice to divide the flow through the pulsation damper. The plug member and damper body are appropriately bored to define a pair of "tuned" flow passages, the longer one of which includes an annular passage defined by the space between the threads on the plug member and the adjacent skirt portion of the damper body, while the short passage is defined between the inlet and outlet, including a flow through the annular flow passage or orifice in the head portion of the pulsation damper body. Both passages register with the common inlet and outlet in the pulsation damper, and are "tuned," in that the ratio of the lengths of the long and short passage are calibrated to provide a half wave length out-of-phase interference between a preceding and succeeding pulsation wave front at the pulsation damper outlet, such that nearly perfect cancellation will occur.

The threaded construction utilized in the pulsation damper of the present invention is thus functional as well as permitting the employment of simple and economical manufacturing techniques, the resulting assembled structure also being strong, rugged, lightweight and incapable of going out of adjustment.

While the damper of the present invention is specifically designed for use in conjunction with a "New York Air Brake" type pump, of the variable delivery axial piston type having a rated output of 6 gallons per minute at 1500 p. s. i. and a shaft speed 1500 R. P. M., the novel structural and functional aspects utilized in the tuned pulsation damper construction of the present invention readily lend themselves for use in damping the pulsations on a wide range of pulsating fluid flows from any source whatsoever.

Accordingly, it is an object of the present invention to provide an improved pulsation damper construction for smoothing a pulsating fluid flow.

Another object of the present invention is to provide an improved tuned pulsation damper construction that utilizes a hollow damper body and a plug member engageable therewith, such that when these components are engaged in assembled relationship, they will define a pair of tuned pulsation damper passageways in the pulsation damper assembly.

A further object of the present invention is to provide an improved tuned pulsation damper that utilizes a hollow pulsation damper body and threadably engageable plug member construction, that permits a simple assembly and results in a strong, rigid assembled relationship of the components, and which construction eliminates misalignment and maladjustment of the components during the life of the device.

A still further object of the present invention is to provide an improved tuned pulsation damper construction that will divide a pulsating fluid flow imposed through the damper into two separate passages in the pulsation damper body, defined between an annular inner wall in the pulsation damper body and a threadably engageable plug member, and that will reunite the flow at the pulsation damper outlet such that the reuniting flows will be in a half wave length out-of-phase relationship, thereby to substantially cancel the pressure surge pulsation in the flow discharging through the pulsation damper outlet.

Still another object of the present invention is to provide an improved tuned pulsation damper construction that has no springs to fatigue or break, and does not require an air charge prior to operation.

A further object of the present invention is to provide a tuned pulsation damper construction that is of a simple, compact, lightweight construction, having essentially only two parts, neither of which is moving, that requires little or no maintenance, and that is simple and economical to manufacture.

Many other objects of the present invention will become manifest to those versed in the art upon making reference to the accompanying sheet of drawings and detailed description which follows, that form a part of this specification.

Figure 2:
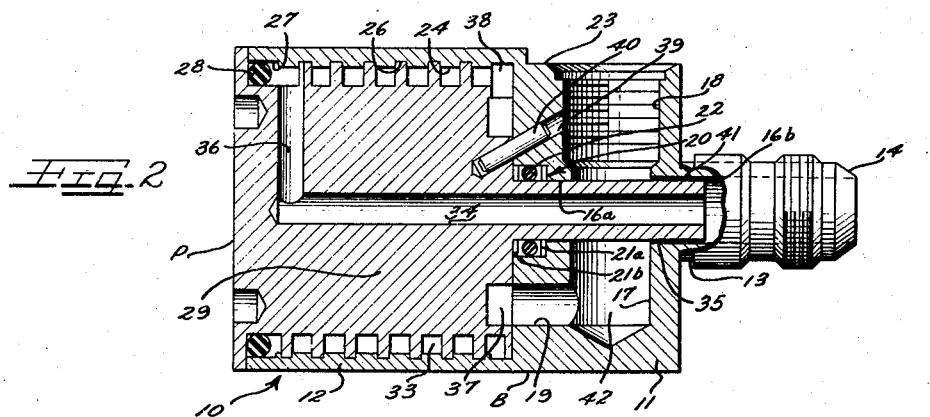
Figure 2 is a side cross-sectional view, substantially along the line II—II of Figure 1.

In Figure 2, the tuned pulse damper assembly 10 is comprised generally of a hollow cylindrical internally threaded pulsation damper body B and an externally threaded plug member P that is adapted to be threadably engageable with the damper body B.

The pulse damper body B includes a generally solid head portion 11 and a hollow internally threaded skirt portion 12. The head portion 11 is formed with a centrally axially depending boss 13 that is formed to permit attachment of a femal flow fitting, such as a nipple 14. The head portion 11 is centrally axially bored as at 16a, and the axially depending boss 13 is also centrally axially bored as at 16b to a particularly sized internal dimension, somewhat larger than the axial bore 16a, for a purpose and function that will be explained in more detail as the description proceeds.

The head portion 11 is also radially bored as at 17 to intersect the axial bore 16a, and is counterbored and threaded as at 18 to threadingly receive a male flow fitting (not shown). A short axial passageway 19 intersects the radial bore 17 in the head portion 11 to provide communication between the bore 17 and the hollow interior of the skirt portion 12. The head portion 11 is also centrally annularly recessed around its internal face portion, adjacent the axial bore 16a, to receive an annular seal assembly 20, that includes a pair of spaced annular washers 21a and 21b and an inclosed annular O-ring seal assembly 22.

It should be understood that the location and type of flow fittings used on the tuned pulsation damper assembly 10 are interchangeable, and that any other suitable seal assembly construction could be used in place of the seal assembly 20, depending upon the particular operating conditions contemplated and assembly techniques used.

Figure 1:
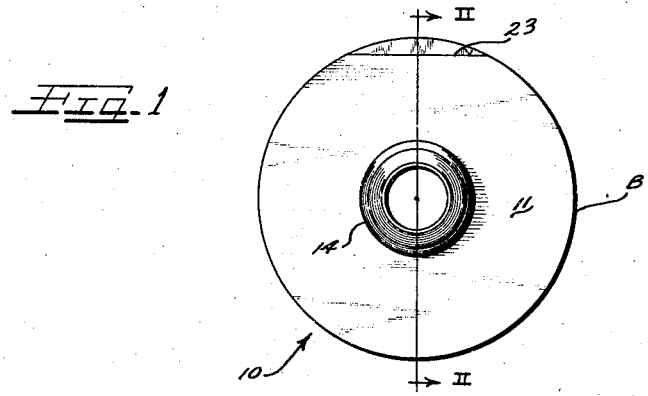
Figure 1 is an elevational view of the inlet end of the tuned pulsation damper of the present invention.

The head portion 11 of the cylindrical pulse damper body B may be flattened as at 23 (Figures 1 and 2) to form a bearing surface for the male flow fitting when the fitting is fully engaged in the threaded portion 18 of the radial bore 17.

The hollow skirt portion 12 of the cylindrical pulse damper body B is formed in a generally tubular configuration having its internal walls 24 annularly grooved or threaded as at 26 to permit engagement of the externally threaded plug member P. The internal wall 24 of the tubular skirt portion 12 is internally axially recessed as at 27 to form an annular engaging surface for an annular seal assembly 28, as for example an O-ring, the prevents fluid leakage between the skirt portion 12 and the plug member P.

Figure 3:
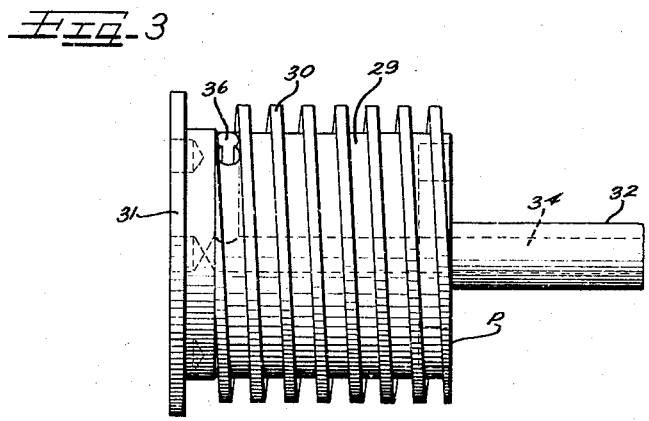
Figure 3 is a side elevational view of the plug member of the tuned pulsation damper of the present invention.

Referring now to Figure 3 in conjunction with Figure 2, the plug member P is comprised generally of a cylindrical body portion 29, having threads 30 formed thereon, a radially outwardly flanged end portion 31 and centrally axially depending tubular portion 32, the tubular portion 32 having an axial length and outer diameter such as to allow its insertion through the axial bore 16a in the head portion 11 of the cylindrical pulse damper body B, and into the axial bore 16b in the axially depending boss portion 13 (Figure 2), the radial dimensions of the bore 16a being such as to provide a close tolerance engagement between the tubular portion 32 and head portion 11, and to provide an annular cylindrical space 35 between the tubular portion 32 and the boss 13, the length and cross-sectional area of the space 35 being held to close tolerances as well as being critical to the proper functioning of the tuned pulse damper assembly 10, as will be explained in more detail later.

As best shown in Figure 3, the threads 30 on the plug body 29 are relatively deep, they being formed with a large crest to root dimension, such that when the plug P has been threaded into the internally threaded skirt portion 12 of the pulse damper body B, a helical passage 33 (Figure 2) will be defined therebetween, the passage 33 together with other communicating passages, forming one of the divided flow branches of the tuned passageways in the tuned pulse damper assembly 10 to accomplish the dampening effects of the present invention.

It should be noted that the respective depth and pitch dimensions of the threads 26 in the internally threaded skirt portion 12 is relatively shallow, as compared to the depth and pitch dimensions of the threads 30 on the plug member P, such that the helical passage 33 will desirably have a cross-sectional area substantially equal to the cross-sectional area of an axial bore 34 in the centrally axially depending tubular section 32, and body portion 29 of the plug member P.

The axial bore 34 in cylindrical plug body portion 29 of the plug member P is interesected by a radial passage 36, substantially adjacent the radially flanged end portion 31, to provide fluid flow communication between the axially depending tubular portion 32 and the helical passage 33 around the plug body portion 29. The radial passage 36 is similarly formed with a cross-sectional area substantially equal to that of the helical passage 33 between the plug member P and skirt portion 12 of the cylindrical pulse damper body B.

The radially flanged end portion 31 has an outer diameter substantially equal to the outer diameter of the cylindrical pulse damper body B, such that when the plug member P has been threadably engaged in the damper body B, a clean unbroken external cylindrical surface will be presented.

The plug member P is also formed with an annular groove 37 (Figure 2) in its end face portion, adjacent the tubular depending portion 32, which communicates with the annular helical passage 33 by a radially registering passage 38. A short connecting axial passageway 19 in the head portion 11 of the pulse damper body B, registers with the bore 17 and threaded radial outlet 18 to thus complete the longer branch of the divided flow path through the tuned pulse damper assembly 10.

The head portion 11 of the cylindrical pulse damper body B and the plug body portion 29 of the plug member B are each co-linearly bored as at 39 at some convenient angle to facilitate insertion of an index pin 40 through the outlet 18, and thus prevent misalignment or unthreading of the plug member P from the cylindrical pulse damper body B after assembly.

It should be understood that any suitable manufacturing techniques can be employed in the formation of the pulsation damper body B and plug member P, such as machining or casting, and that each of these components may be constructed of any suitable material, such as metal or plastic, depending on the operating conditions to be encountered, When the seal assemblies 20 and 28 have been inserted and plug member P has been fully threaded into the cylindrical pulse damper body B and locked in position by inserting index pin 40 in the axial bore 39, the components of the tuned pulse damper assembly 10 will assume the general relationship illustrated in Figure 2. When thus assembled, it will be noted that the tubular depending portion 32 of the plug member P projects through the head portion of the pulse damper body B and into the axial bore 16b in the centrally axially depending boss 13, to form the annular cylindrical space 35 having a calibrated cross-sectional area and length such as to provide a flow metering function and equalize the pressure head losses in the short branch of the divided flow passage formed from the inlet fitting 14, through the annular cylindrical metering space 35 and radial bore 17, to the threaded outlet 18. The length of the shorter branch of the divided flow passage is dependent upon the extent of axial insertion of the tubular portion 32 into the axial bore 16b of the depending boss 13, and is a relatively nonvariable dimension, while the length of the longer tube passage, defined by the central and radial bores 34 and 36, respectively, in the plug member P, the annular helical passage 33, the annular groove 37 and connecting passageway 19, is a more readily variable dimension, through the simple expedient of varying the pitch of the threads 30 on the cylindrical body portion 29 of the plug member P.

Thus the cross-sectional areas of the long and short branches of the divided flow passages in the tuned pulsed damper assembly 10 and the total head losses are substantially equal to each other, so that a substantially equal division in the pulsating flow entering the inlet flow fitting 14 will occur at the point where the incoming flow is imposed through the annular flow metering space 35 and the axial bore 34 in the plug member P.

Thus it will be appreciated that when the plug member P and pulse damper body B have been assembled as illustrated in Figure 2, two distinct flow passages are defined in the pulse damper assembly 10 through which the pulsating fluid flow may pass as a divided flow, to later rejoin at what may be termed an interference or modulation chamber 42, defined at the general intersection of the axial passage 19 and annular flow metering passage 35 with the radial bore 17, the modulated flow thereafter discharging radially through the outlet 18 substantially pulsating free.

The relative length of the short and long branches of the divided flow passages in the tuned pulse damper assembly 10 are calibrated in accordance with the speed of advancement of a wave front pulsation in the pulsating flow, the ratio of the relative lengths being such that the dividend flow in the long tube branch of the divided flow entering the modulating chamber 42 will be substantially out of phase with the divided portion of the pulsating fluid flow entering the modulating chamber 42 from the short passage branch of the divided flow by a half wave length, or an odd multiple thereof, in order to obtain a cancellation of the pulsations in the chamber 42.

Thus it will be appreciated that by dividing the pulsating flow in the tuned pulse damper assembly 10 and then rejoining the flows at an out-of-phase point equal to one half wave length of the pulsation wave front, or an odd multiple thereof, cancellation of the pressure impulse will occur, and, a resulting pulsation free flow will be obtained at the outlet 18. The ratio of the relative lengths of the long and short branches of the divided flow passages in the tuned pulse damper assembly 10 is determined from the speed of sound of the pulsation wave front in the pulsating fluid to be smoothed at the inlet 14 of the tuned pulse damper assembly 10, the total length of the longer tube passage being so calibrated that the wave front passing through the long tube will rejoin a succeeding wave front passing through the short tube into the modulating chamber 42, in a half wave length out of phase relationship, in order to obtain cancellation of the pressure impulse.

A specific example illustrating the operation of the tuned pulse damper assembly 10 may be helpful to explain the damping action of the present invention.

Assuming that the tuned pulse damper assembly 10 is connected to a fluid flow having a pulsation impulse imposed thereon such that the speed of advancement of a single pulsation wave front is approximately 100 inches per pulsation cycle. The length of the long branch of the divided flow passage in the pulsation damper assembly 10 must then be approximately 50 inches longer than the short branch. Assuming further then that the extent of axial insertion of the tubular portion 32 of the plug member P into the axial bore 16b of the depending boss 13 is such as to provide an approximate short branch length of 1 inch, it will only remain to calibrate the length of the long tube passage defined by the axial and radial passages 34 and 36, respectively, in the plug body 29, and the length of the helical passage 33 around the plug body 29 to equal a total length approximating 51 inches. Inasmuch as the length of the axial passage 34 and radial passage 36 as relatively fixed, the greatest variable dimension available will be that of the helical passage 33 formed between the threads 30 on the plug body 29. It will thus be apparent that the plug P may be initially formed with any desired thread pitch to obtain a desired length of the longer branch, or a relatively large number of threads could be initially formed thereon, some of which could be selectively removed and suitable baffling employed to tailor the long tube length for a particular pulsation frequency.

Thus it will be appreciated that the tuned pulse damper assembly 10 of the present invention presents a novel pulsation damper construction that is small, compact, lightweight, and that is simple and economical to manufacture, the device being readily adaptable for use with varying pulsating fluid flows to provide a relatively pulsationless free flow at the outlet of the damper assembly.

While only one embodiment of the present invention has been herein described, it should be understood that various modifications and variations may be effected without departing from the scope of the novel concepts herein disclosed.

I claim as my invention:

1. A pulsation damper adapted to smooth a pulsating fluid flow comprising a damper body defining an inlet of predetermined cross-sectional area, a damper plug received in said damper body having a tubular portion extending into said inlet for a predetermined distance and spaced radially therefrom by a predetermined amount such as to define a relatively short flow passage, said damper plug cooperating with said damper body to define a relatively long passage having its inlet end defined in said tubular portion extending from said damper body inlet and a common outlet in said damper body for said long and short passages immediately adjacent said damper body inlet and communicating with said relatively short passage.

2. A pulsation damper adapted to smooth a pulsating fluid flow comprising a damper body having an inlet of predetermined cross-sectional area, a member engageable with said damper body having a portion thereof extending into said inlet of said damper body in predetermined radially spaced relation thereto for a predetermined axial distance to define a relatively short flow passage therewith, said portion having a passage therein disposed coaxially within said inlet, said member cooperating with said damper body to define a relatively long passage extending from said passage in said portion, and a common outlet for said short and long passages, said short passage opening directly into said common outlet.

3. A pulsation damper comprising a damper body having an inlet of predetermined cross-sectional area and axial dimension, said damper body defining a generally cylindrical cavity therein, a plug member having a tubular portion received in said inlet and radially spaced therefrom by predetermined amount, said tubular portion extending into said inlet in radially spaced relation thereto to define a relatively short passage, said plug member being threaded externally and having a root diameter for the threads sufficient to cooperate with said cylindrical cavity portion of said damper body to define a helical passage leading from said tubular portion, and a common outlet means defined by said damper body for said long and short passages.

4. A pulsation damper comprising a hollow damper body having an inlet and an outlet formed therein, said inlet communicating directly with said outlet, said damper body being formed with a generally cylindrical cavity defining a head portion and a tubular skirt portion thereof, a plug member engageable in said damper cavity and having means formed thereon cooperable with the tubular skirt portion of said damper body to define an annular flow passage therebetween, said plug member having a tubular depending portion in registry with the annular flow passage in said damper and extending into the inlet of said damper body to divide the flow through said damper and to define an annular flow metering passage between said tubular extension and said inlet, said annular flow passage communicating said outlet with said inlet and defining the long branch of the divided flow through the tubular extending portion of said plug member to the outlet in said damper body, said annular metered flow passage communicating said outlet with said inlet and defining the short branch of the divided flow from said inlet to said outlet in said damper body, seal means between said damper body and said plug member, and means for locking said damper body and plug member in assembled relationship.

5. A pulsation damper adapted to dampen a pulsating fluid flow comprising a generally cylindrical damper body having a cavity therein defining a thickened head portion and a hollow tubular skirt portion, a generally cylindrical plug member threadably engageable in the hollow skirt portion of said damper body and cooperable therewith to define an annular flow passage between said plug member and the walls of said skirt portion, said thickened head portion having an inlet and an outlet formed therein, said plug member having means cooperable with said inlet to divide the flow in said damper into a relatively short branch from said inlet around said means to said outlet and a relatively long branch from said inlet through said means and annular flow passage between said plug member and the walls of said skirt portion of said damper body to said outlet, said long and short branches having respective lengths such as to provide a half wave length out of phase interference between a preceding and succeeding wave front pulsation at the reunion point in said damper to cancel the pulsations in said flow, seal means between said damper body and plug member to prevent the leakage of pressurized fluid therebetween, and lock means for maintaining said damper body and plug member in assembled relationship.

6. A pulsation damper adapted to dampen a pulsating fluid flow comprising a damper body having a cavity formed therein defining a solid head portion and a tubular skirt portion, said tubular skirt portion being formed with internal relatively shallow depth threads, said head portion having an axial bore and an intersecting radial bore formed therein defining an axial inlet and a radial outlet in said damper body for said damper, a generally cylindrical externally threaded plug member having a tubular extension formed at one end thereof and an annular radially flanged portion formed at the other end thereof threadingly engageable in the internally threaded skirt portion of said damper body, said externally threaded plug member being formed with deep threads, said internally threaded skirt portion and externally threaded plug member defining a helical flow passage therebetween when engaged, said helical flow passage being in communication with the outlet in said head portion, said plug member also having a tubular depending portion and defining a central axial bore formed therein coaxial with the bore in the tubular depending portion thereof and a radial bore adjacent its radially flanged end portion to provide registry between said central axial bore and said helical flow passage, said tubular extension being sized to be insertable into the inlet in said head portion in loose fitting relationship to thereby define an annular metering flow passage in said pulsation damper, annular seal means adjacent said radially flanged end portion between said plug member and said tubular skirt portion, annular seal means around tubular depending portion between said plug member and the head portion of said damper body, and locking means between said plug member and said damper body to prevent an unthreading thereof.

7. A pulsation damper comprising a hollow damper body having an inlet and an outlet formed therein, a threaded plug member engageable in the hollow portion of said damper body, said plug member having a tubular depending portion adapted to extend through said damper body and inlet to form an annular metering flow passage, said threaded plug member and said hollow damper body defining the long branch of a divided flow passage through said pulsation damper, the flow from the inlet through said annular metering flow passage to said outlet forming the short branch of a divided flow passage through said damper between said plug member and said damper body, and seal means around said tubular depending portion to prevent leakage between the long and short branches of said divided flow passages, the long and short branches of said divided flow passages having calibrated relative lengths to provide a half-wave out-of-phase interference between pulsations at the outlet of said damper body to substantially eliminate the pulsations from the pulsating fluid flowing through said pulsation damper.

References Cited in the file of this patent

UNITED STATES PATENTS

| | | |
|---|---|---|
| 1,975,634 | Dijksterhuis | Oct. 2, 1934 |
| 1,980,085 | Perry et al. | Nov. 6, 1934 |
| 2,490,493 | Wade | Dec. 6, 1949 |
| 2,707,525 | Janeway | May 3, 1955 |

FOREIGN PATENTS

| | | |
|---|---|---|
| 131,434 | Great Britain | Aug. 16, 1918 |